United States Patent [19]

Shepherd et al.

[11] Patent Number: 5,433,471
[45] Date of Patent: Jul. 18, 1995

[54] SIMPLIFIED PASSENGER AIR BAG MODULE

[75] Inventors: Jeffrey A. Shepherd, Fairborn; Michael W. Donegan, Bellbrook, both of Ohio

[73] Assignee: General Motors Corporation, Detroit, Mich.

[21] Appl. No.: 165,204

[22] Filed: Dec. 13, 1993

[51] Int. Cl.[6] ............................................. B60R 21/16
[52] U.S. Cl. .................................. 280/728.2; 280/732
[58] Field of Search .............. 280/728 A, 728 R, 732, 280/736, 728 B

[56] References Cited

U.S. PATENT DOCUMENTS

| | | | |
|---|---|---|---|
| 4,915,410 | 4/1990 | Bachelder | 280/732 |
| 5,062,664 | 11/1991 | Bishop et al. | 280/732 |
| 5,332,256 | 7/1994 | Lauritzen et al. | 280/728 A |

FOREIGN PATENT DOCUMENTS

969990 6/1975 Canada ........................ 280/732

*Primary Examiner*—Karin L. Tyson
*Attorney, Agent, or Firm*—Charles E. Leahy

[57] ABSTRACT

An air bag module comprises an air bag, an air bag retainer ring, a housing, an elongated inflator, and an inflator container. The retainer ring is secured to the air bag about its opening and has a mounting flange. The housing has spaced side and end walls defining a rectangular air bag storage chamber for storing a folded air bag and which has an upper air bag deployment opening and a bottom gas discharge opening. A mounting flange extends from each of the side walls, and four spaced straps span the gas discharge opening to interconnect the side walls and form an inflator cradle. The inflator is located on the straps and comprises a substantially cylindrical case having a plurality of gas discharge holes, a cap end and a blank end. The container comprises a U-shaped body forming bottom and side walls, two spaced raised ribs formed in the bottom wall, and a mounting flange extending from each of the side walls. Three pairs of aligned mounting apertures are formed in all of the mounting flanges. Threaded studs are staked to the retainer ring and extend through the aligned apertures. Nuts engage the stud ends to clamp the retainer ring, the housing and the container together, clamping the inflator between two straps and the ribs. The ribs space the inflator from the side and bottom walls of the container, which functions as a heat shield. The studs are the sole means used to fasten the module components together.

13 Claims, 8 Drawing Sheets

SIMPLIFIED PASSENGER AIR BAG MODULE

BACKGROUND OF THE INVENTION

This invention relates generally to vehicle air bag modules and, more particularly, to a passenger-side air bag module of simplified construction that can be used with all currently-available pyrotechnic inflators.

It is becoming more common for vehicle manufacturers to supply passenger vehicles with both driver-side and passenger-side air bag modules. The passenger-side installation is conventionally mounted within the vehicle instrument panel, with air bag deployment through a deployment door located in either the top surface or the front surface of the instrument panel. A front-mounted installation frequently requires a dislocation of the usual glove box. Currently, many air bag module installations are a so-called mid mount, located above the glove box.

In its simplest form, an air bag module consists of an inflator, a container for housing the inflator, an air bag, and an air bag retainer for mounting the air bag to the container, some means for housing or restraining the folded air bag. Conventionally, an air bag module is designed for a specific vehicle, and different vehicles will have different modules.

In addition, the module is usually designed for a specific inflator. Several manufacturers supply passenger-side inflators. Two types of inflator are supplied: directional and thrust-neutral. Both are generally cylindrical, with a nominal diameter of 60 mm, although one available inflator includes a slight outward flare, or taper, at the cap end. In both types, a plurality of discharge holes are provided to provide discharge gas to the air bag for inflation and deployment. These holes are initially covered by foil of different thicknesses which bursts at different pressures to sequentially discharge gas as gas pressure rises.

Directional inflators have a plurality of discharge holes along one side of the inflator casing and produce a net thrust force on the module. They usually include a stud, mounting bolt or other orientation device to assure mounting in a module with the discharge holes oriented to assure gas discharge upwardly out of the container into the air bag.

Directional inflators are frequently mounted with the non-ported sides of the inflator exposed. Because inflator ignition to produce inflation gas results in the inflator casing becoming very hot, a heat shield is sometimes provided to protect the instrument panel innards from excessive heat.

Thrust neutral inflators have discharge holes on opposite sides of the casing, thereby creating no net thrust force on the module. Since inflation gas exhausts from both sides of the inflator, the inflator must be mounted in an enclosed container which will direct inflation gas upwardly out of the container into the air bag.

Conventional air bag modules comprise a plurality of metal stampings which are assembled into a completed module through the use of welds and threaded fasteners in the form of threaded studs, bolts and nuts. These fasteners interconnect various stampings to form the container, mount the air bag retainer to the container, secure the air bag restraint/housing to the container, mount the inflator in the container, mount the heat shield to the module (or to the instrument panel structure, and frequently secure an air bag deployment chute to the assembly. The container usually is secured to a mounting bracket for attachment to the instrument panel supports structure. Also, separate fasteners are used to secure a discharge door to the assembly or to the module mounting bracket.

Thus, distinct air bag modules are required for each specific installation, and for each specific type and shape of inflator. These air bag modules require lengthy assembly time to unite all of the component bits and pieces with a variety of fasteners. Care must be taken to prevent inadvertent mis-assembly of the component parts. As a result, air bag modules are relatively expensive.

It would be desirable to reduce air bag module assembly time and cost. It would also be desirable to provide a passenger-side air bag module which can accommodate all available makes and types of inflators. It also would be desirable to provide an air bag module of reduced complexity and having fewer parts which are simple to assemble. It also would be desirable to provide an air bag module which cannot be mis-assembled.

SUMMARY OF THE INVENTION

It is therefore an object of this invention to provide an air bag module designed to reduce air bag module assembly time and cost.

It is another object of this invention to provide a passenger-side air bag module which can accommodate all available makes and types of inflators.

It yet another object of this invention to provide an air bag module of reduced complexity and having fewer parts which are simple to assemble.

It is a further object of this invention to provide an air bag module which cannot be misassembled.

In one aspect, this invention features an air bag module comprising an air bag, an air bag retainer ring, a housing, an elongated inflator, and an inflator container. The air bag retainer ring is secured to the air bag about its opening and has a mounting flange. The housing has spaced side and end walls defining a rectangular air bag storage chamber for storing a folded air bag and which has an upper air bag deployment opening and a bottom gas discharge opening. A mounting flange extends from each of the side walls, and at least two spaced straps span the gas discharge opening to interconnect the side walls and form an inflator cradle. The inflator is located on the straps and comprises a substantially cylindrical case having a plurality of gas discharge holes, a cap end and a blank end. The inflator container comprises a U-shaped body forming bottom and side walls, at least two spaced raised ribs formed in the bottom wall, and a mounting flange extending from each of the side walls. A plurality of aligned mounting apertures are formed in all of the mounting flanges, and a plurality of threaded fasteners extend through the aligned apertures to clamp the air bag retainer ring, the inflator housing and the inflator container together. This clamps the inflator between the straps and the ribs, and the ribs space the inflator from the side and bottom walls of the inflator container which functions as a heat shield.

Preferably, the ribs and the straps are spaced to form pairs such that each rib and its paired strap engage the inflator case on diametrically opposite sides. The pairs are spaced from the one end to enable clamping of either an inflator having a case with an outward taper near its cap end or an inflator having a purely cylindrical case.

Preferably, the holes are spaced along the flanges in a pattern which aligns the apertures of all flanges to permit assembly when the air bag retainer ring, the housing and the inflator container are in a predetermined relative orientation. The hole pattern will misalign to prevent misassembly when any of the air bag retainer ring, the housing and the inflator container are not in the predetermined relative orientation.

In another aspect, this invention features comprise threaded studs secured to the air bag retainer ring, and threaded nuts which engage the studs beneath the inflator container flanges. The air bag assembly includes a cover assembly which comprises a main body having weakened sections which define doors and which rupture upon inflation of the air bag to open a deployment opening for the air bag. A pair of mounting flanges extend from the sides of the main body, each having a plurality of mounting apertures aligned with the apertures in the other mounting flanges. The side flanges are L-shaped to embrace the air bag retainer ring when the side flanges are assembled over the threaded studs, which extend sequentially through the aligned mounting flange apertures of the air bag retainer ring, the cover assembly, the housing and the inflator container.

Preferably, one of the housing end walls is formed cooperate with one end of the inflator container to embrace the inflator end cap, and the other housing end wall includes a U-shaped inward flange embracing the other end of the inflator container. This forms a substantially closed inflator chamber beneath the housing discharge opening, enabling use of a thrust-neutral inflator.

Preferably, the pairs of straps are located to cover only the highest pressure gas discharge holes when used with an inflator having gas discharge holes that open at different pressures. Two clamping strap and rib pairs are provided and the housing includes a spaced pair of bridging straps which interconnect its side walls but are radially spaced from the inflator case and do not block any inflator discharge holes.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
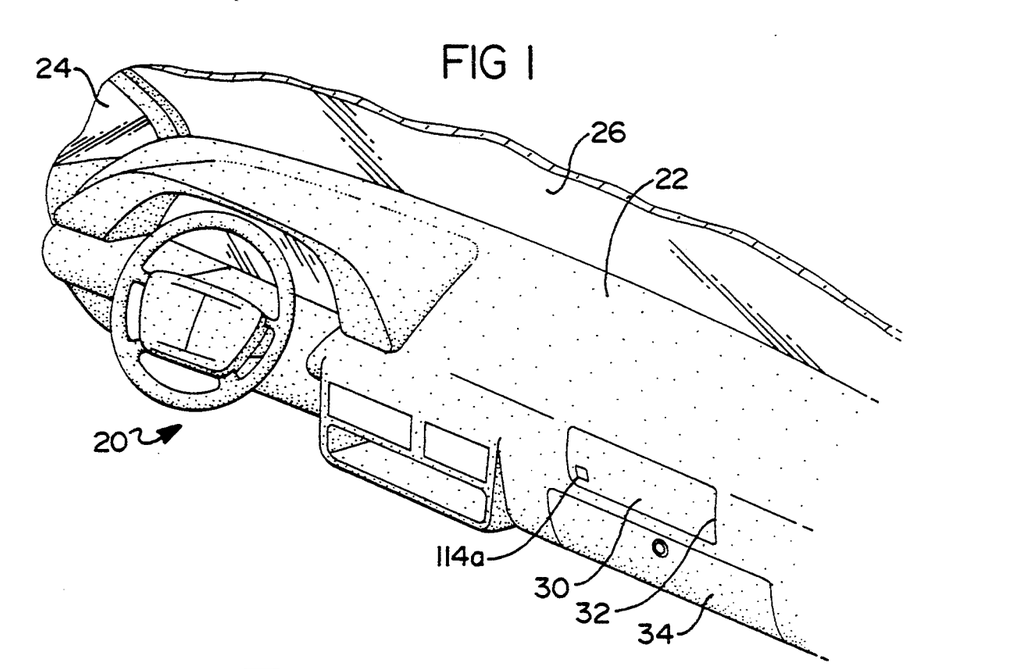
FIG. 1 is a perspective view of a portion of a vehicle interior, illustrating an instrument panel incorporating an air bag module according to this invention.
Figure 2:
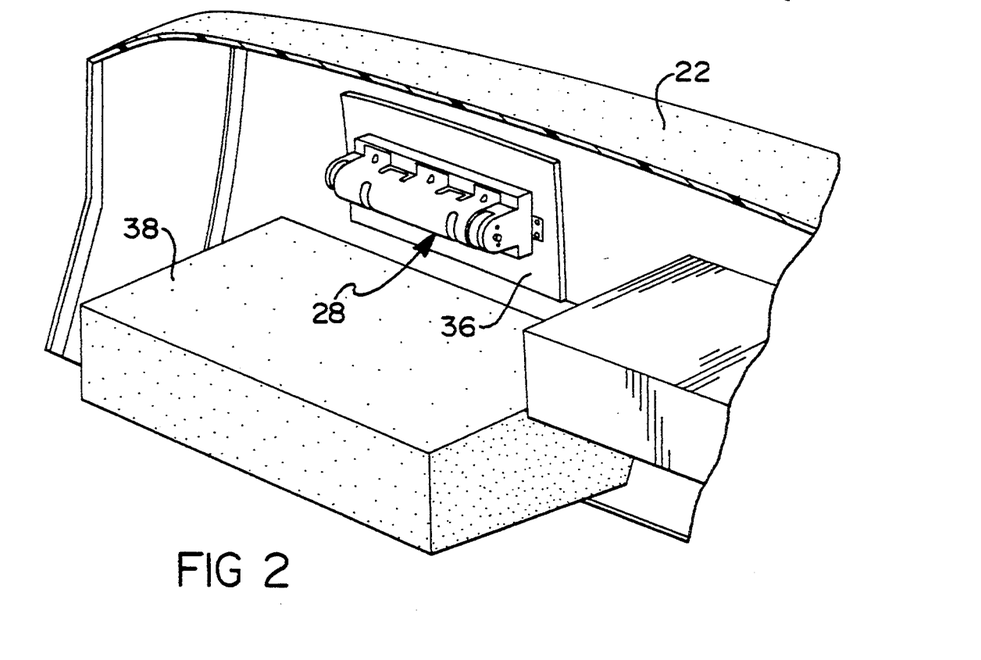
FIG. 2 is a perspective view of a portion of the rear side of the instrument panel of FIG. 1, illustrating the mounting of an air bag module according to this invention.

As shown in FIGS. 1 and 2, a vehicle passenger compartment 20 includes an instrument panel 22 which is bounded by vehicle side doors 24 (only one shown) and windshield 26. An air bag module 28 has a decorative cover 30 which closes an air bag deployment opening 32 located above a glove box door 34 in the front face of instrument panel 22. Air bag module 28 is mounted to an instrument panel support 36 above a glove box 38 on the rear side of instrument panel 22.

Figure 3:
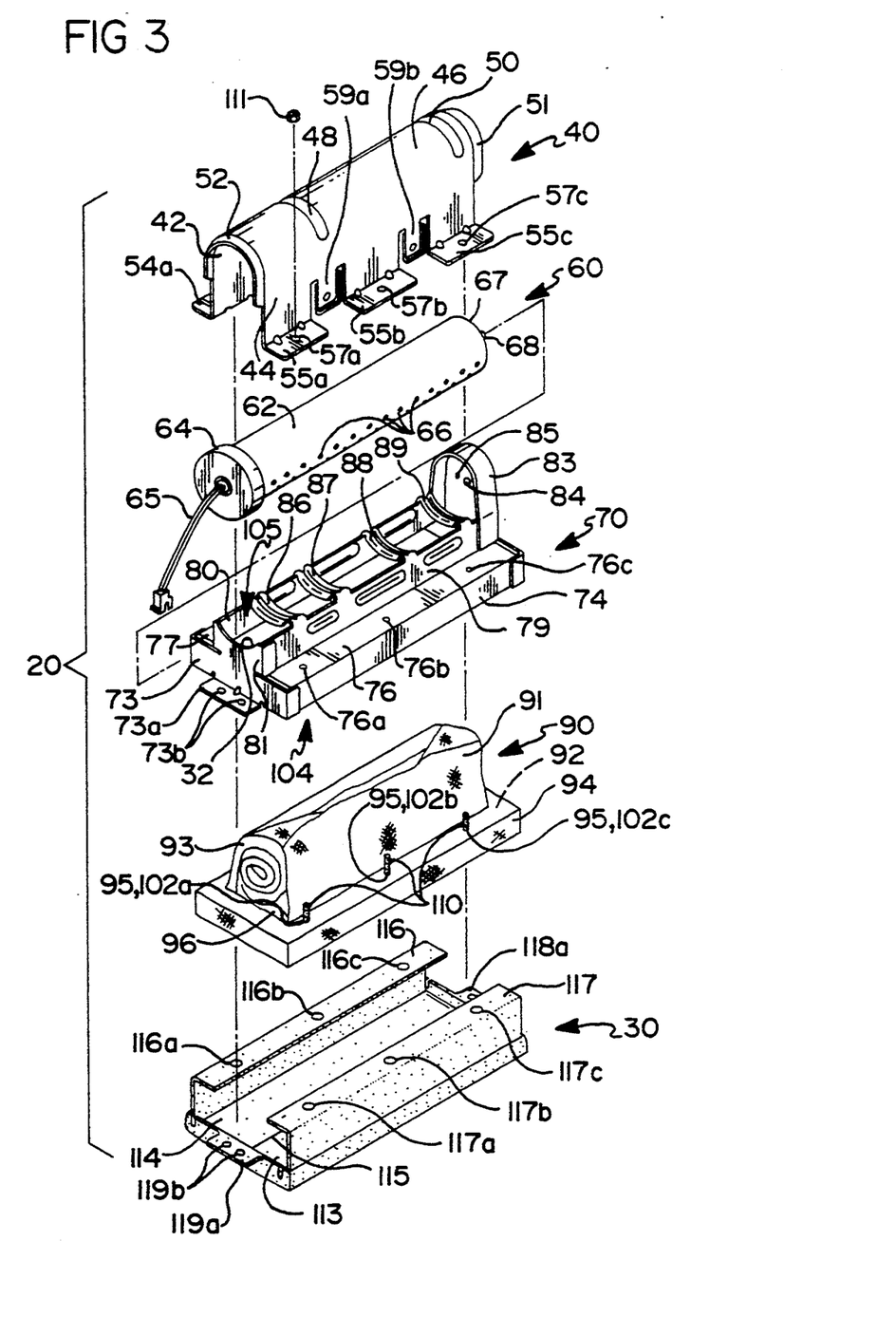
FIG. 3 is an exploded perspective view of the air bag module of this invention, showing an inflator container, an inflator, a housing, an air bag and retainer ring subassembly, and a cover.

As shown in FIG. 3, air bag module 28 comprises cover 30, an inflator container 40, an inflator 60, housing 70 and an air bag subassembly 90. All components of air bag module 28, except inflator 60, are clamped together solely by six threaded fasteners in the form of studs 110 and mating nuts 111, as will be described later.

Figure 4A:
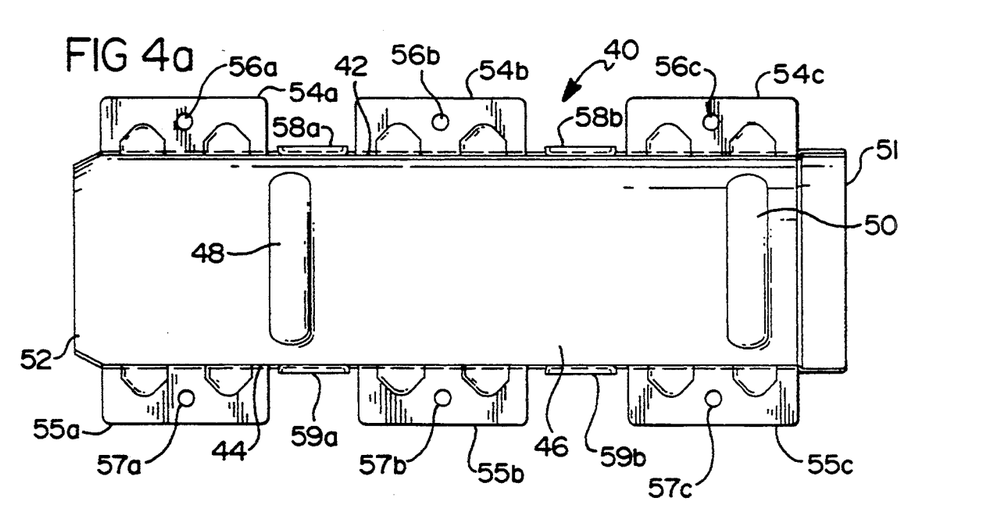
FIGS. 4a, 4b and 4c are bottom, side and end views of the module inflator container.
Figure 4B:
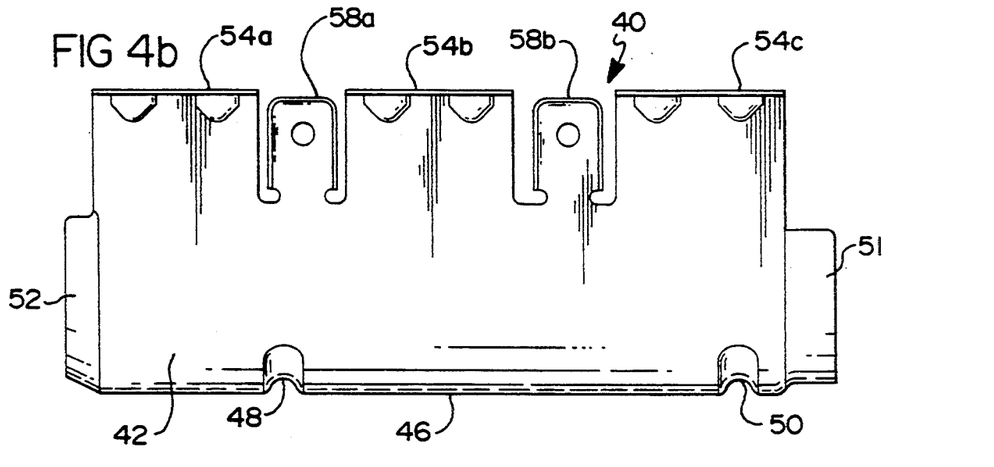
Figure 4C:
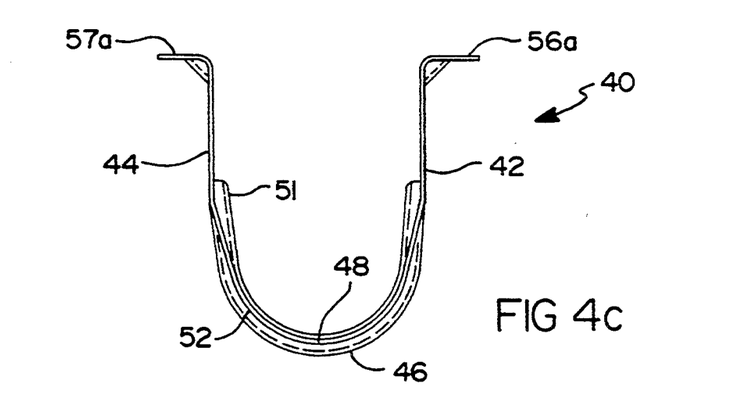

FIGS. 4a, 4b and 4c illustrate inflator container 40 as comprising a weldment having a U-shaped body with upstanding side walls 42 and 44 which are interconnected by a curved bottom wall 46, as best seen in FIGS. 4a, 4b and 4c. A pair of spaced ribs 48 and 50 are formed in bottom wall 46 to support an inflator. The location and spacing of ribs is such that either inflator 60 or other inflators can be accommodated, as will be described later.

The body of container 40 terminates in a curved assembly flange 51 and an inflator collar 52. Spaced mounting flanges 54a, 54b, 54c and 55a, 55b, 55c extend outwardly from the upper ends of side walls 42 and 44. The mounting flanges include respective mounting apertures 56a, 56b, 56c and 57a, 57b, 57c which are specifically placed along the length of container 40 to prevent mis-assembly of air bag module 28, as will be later described.

Apertured mounting tabs 58a and 58b are formed in side wall 42 between mounting flanges 54a, 4b and 54c. Similarly, apertured mounting tabs 59a and 59b are formed between mounting flanges 55a, 55b and 55c in side wall 44. These mounting tabs may be selectively bent outward to mount air bag module 28 to the structure within different vehicle instrument panels.

Figure 7B:
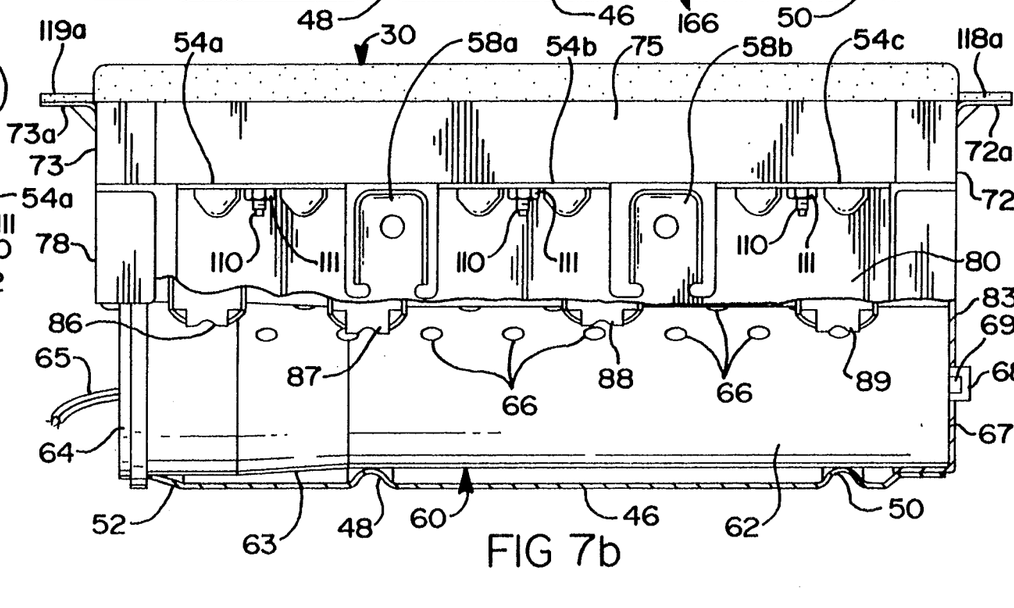

Inflator 60 is best seen in FIGS. 3 and 7b. It comprises a casing 62 which conventionally comprises a deep drawn aluminum shell having a nominal diameter of approximately 60 mm. Casing 62 is generally cylindrical, but includes an outwardly-tapered section 63. Casing 62 is closed at its open end beyond tapered section 63 by a cap 64 from which squib wiring 65 extends.

Casing 62 includes a plurality of gas discharge holes 66 along one side, which makes inflator 60 directional. To assure that inflator 60 is assembled with holes 66 oriented upwardly, the closed or blank end 67 of casing 62 mounts a D-shaped orientation lug 68 and anti-rotation pins 69.

Figure 7C:
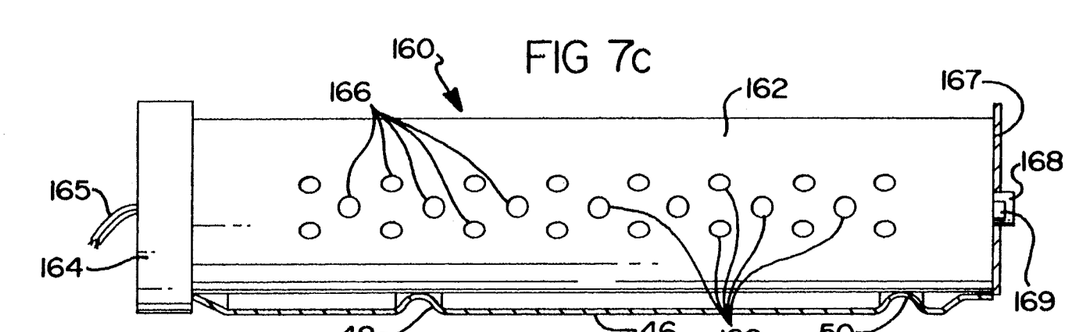
Figure 7D:
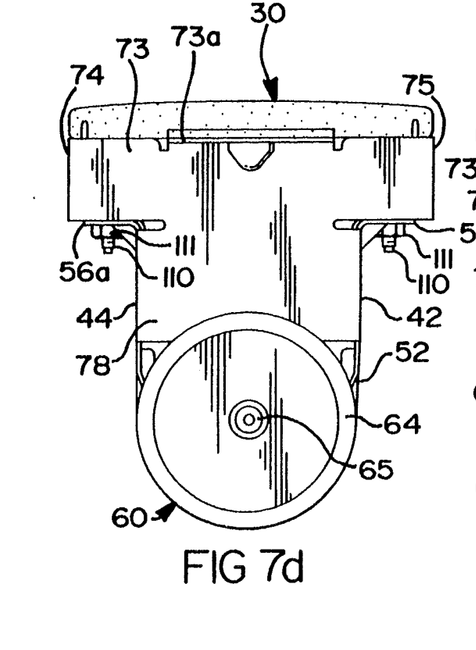

A different type of inflator 160 is shown in FIG. 7c. The body 162 of inflator 160 includes holes 166 formed in opposite sides (only one side illustrated). Gas discharges from these holes produces self-canceling forces, making inflator 160 thrust neutral. Inflator 160 also includes an end cap 164 which houses squib wiring 165 and a D-shaped orientation lug 168 and anti-rotation pins 169 extending from blank end 167. Inflator body 162 is generally cylindrical, having a nominal 60 mm diameter, like inflator 60, but is completely cylindrical.

As shown in FIG. 7b, inflator container rib 48 is spaced from inflator collar 52 a sufficient distance to assure contact with inflator 60 body 62 at a point beyond tapered portion 63, i.e. on its cylindrical portion. FIG. 7c shows rib 48 contacting inflator 160 on its cylindrical body 162. Thus the spacing of rib 48 assures that container 40 can be used with either directional inflator 60 or thrust-neutral inflator 160.

Figures 5A, 5B, 5C:
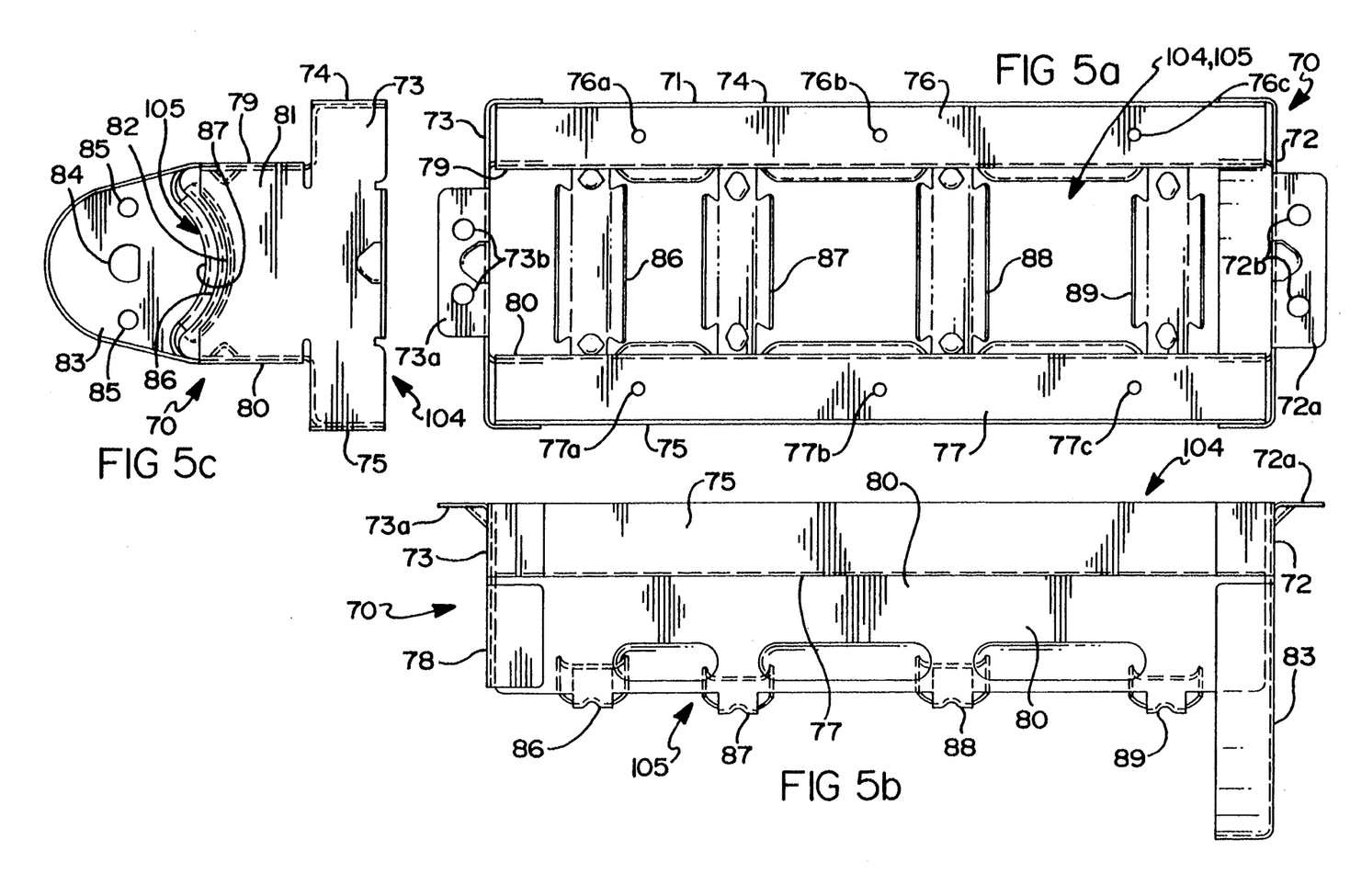
FIGS. 5a, 5b and 5c are bottom, side and end views of the module housing.

Housing 70 is best seen in FIGS. 5a, 5b and 5c. It is a weldment comprising an upper section 71 having a perimeter frame having end plates 72 and 73 interconnected by side plates 74 and 75 which define an upper air bag deployment opening. End plate 72 includes a projecting mounting tab 72a having spaced mounting holes 72b. Similarly, end plate 73 includes a projecting mounting tab 73a having spaced mounting holes 73b. Mounting tabs 72 and 73 are provided to mount air bag module 28 to instrument panel support 36, as shown in FIG. 2. To assure the proper mounted orientation of module 28, holes 72b are spaced further apart than are holes 73b so that module 28 can cannot be mismounted.

Side plates 74 and 75 extend inwardly to form respective mounting flanges 76 and 77 that include mounting apertures 76a, 76b, 76c, 77a, 77b and 77c. Housing 70 includes a lower portion 78 that comprises side walls 79 and 80, which are extensions of respective mounting flanges 76 and 77. End wall 73 includes a lower portion 81, having an arcuate cutout 82, while end wall 72 includes a flanged lower portion 83, having a D-shaped orientation hole 84 and spaced anti-rotation holes 85. Flanged end wall portion 83 is formed to embrace the blank ends 67, 176 of inflators 60, 160, with lug orientation hole 84 receiving orientation lugs 68, 168 and anti-rotation holes 85 receiving pins 69, 169. Mounting holes 85 are provided to accommodate inflators which have spaced end mounting pins.

Side walls 79 and 80 are interconnected by spaced straps 86, 87, 88 and 89. All straps are arcuate, as shown in FIG. 5c. FIGS. 5b show that alternate straps 87 and 89 project lower than straps 86 and 88, while FIG. 7b shows that straps 87 and 89 are spaced to lie exactly diametrically opposite container ribs 58 and 50 to form a cradle for inflator 60.

Upon assembly, straps 87 and 89 contact the cylindrical surface of inflator casing 62 to clamp it between the pairs of opposed ribs and straps 87, 48 and 89, 50. FIG. 7b also shows that, upon assembly, straps 86, 88 are spaced from inflator casing 62, thus covering none of the gas discharge holes 66. Straps 87, 89 and ribs 48, 50 are purposely narrow so as to cover as few inflator holes as possible and then to cover only the highest pressure holes.

Air bag subassembly (FIG. 3) comprises an air bag 91 and an air bag retainer ring 92. Air bag 91 includes an inflatable body 93 which terminates in a hem 94, which includes six spaced mounting holes 95 and which defines an opening 96 for receiving inflation gas discharged from inflator 60.

Figure 6A:
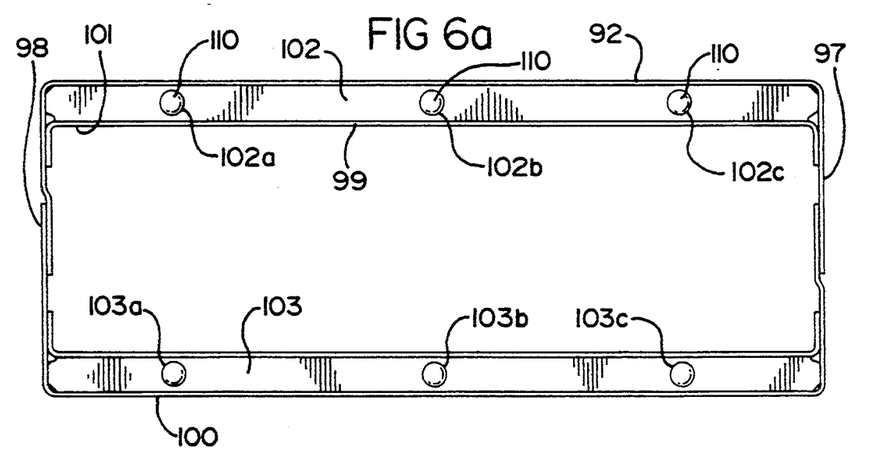
FIGS. 6a, 6b and 6c are top, side and end views of the air bag retainer ring.
Figure 6B:
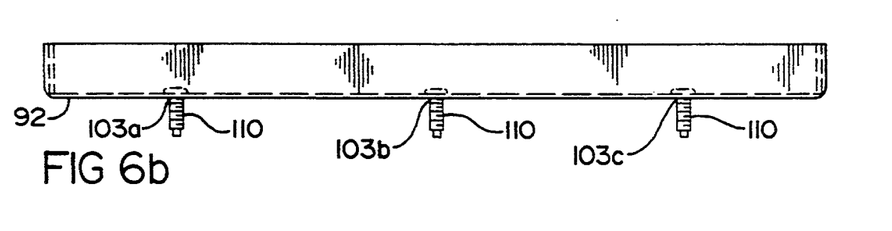
Figures 6C, 7A:
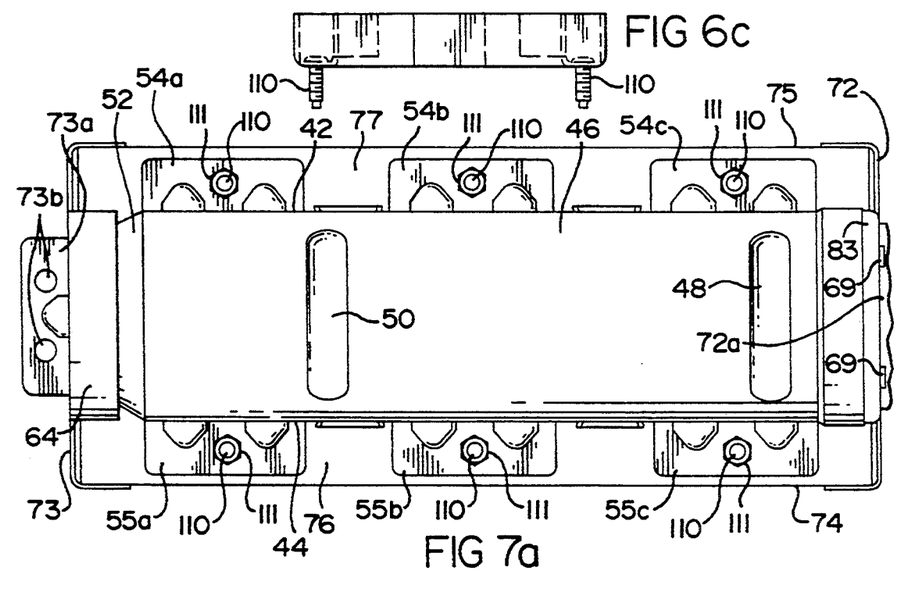
FIGS. 7a, 7b, 7c and 7d are bottom, side, partial side and end views of the air bag module, with the side and partial side views partially broken away.

As shown in FIGS. 6a, 6b and 6c, retainer ring 92 is a rectangular weldment having ends 97 and 98 interconnected by elongated side channels 99 and 100 defining a central opening 101. Side channels 99, 100 include horizontal mounting flanges 102, 103 which contain respective spaced mounting apertures 102a, 102b, 102c, 103a, 103b and 103c.

Figure 8A:
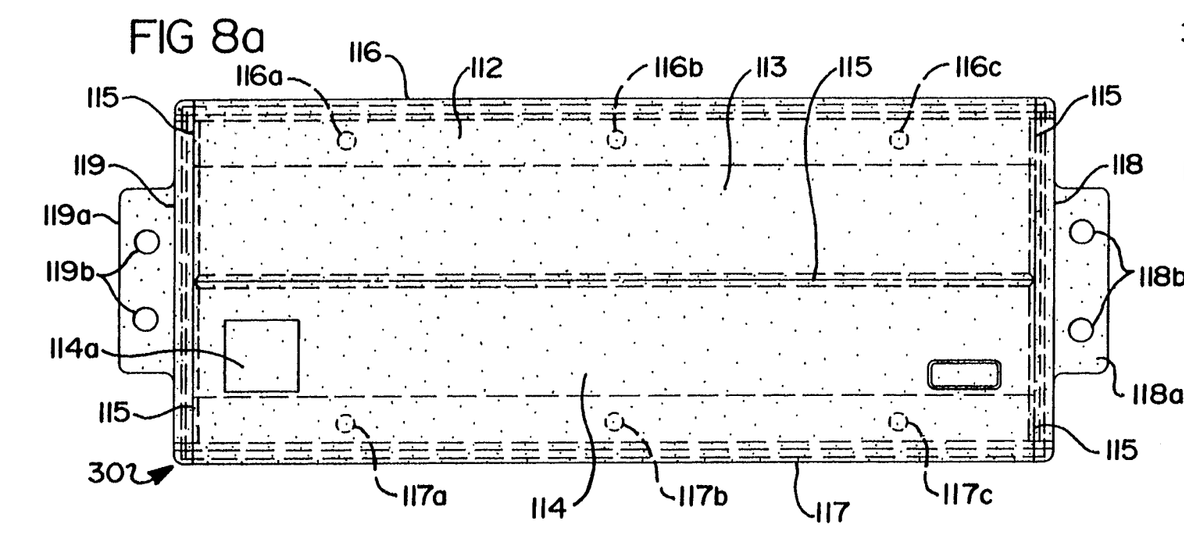
FIGS. 8a, 8b and 8c are top, side and end views of the cover.
Figure 8B:
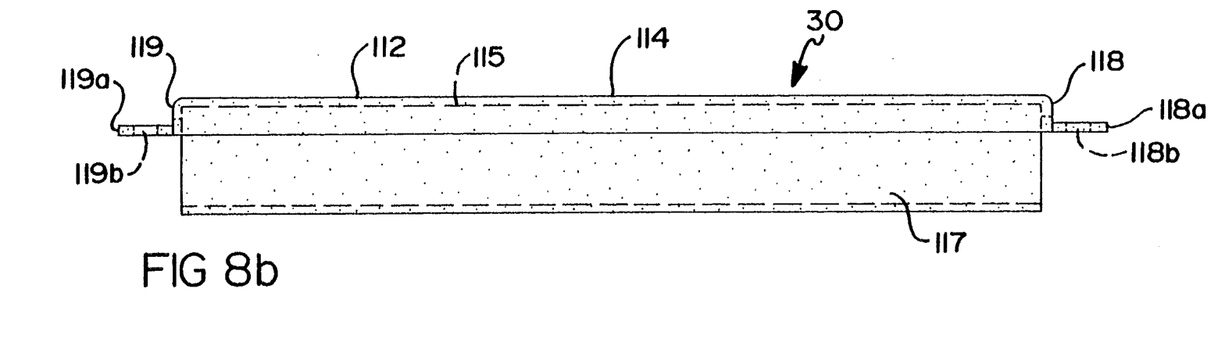
Figure 8C:
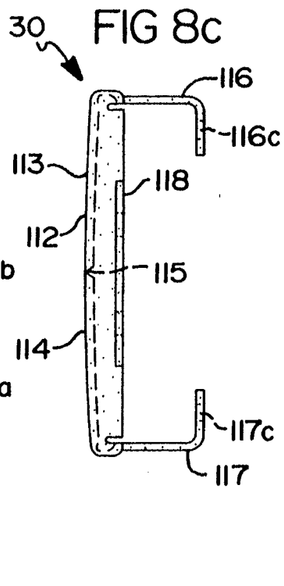

Air bag assembly cover 30 is shown in FIGS. 8a, 8b and 8c. Cover 30 is a plastic molding preferably formed of the same material as the covering of instrument panel 22. It includes a central body 112 comprising upper 113 and lower 114 door segments define by a tear line 115. Lower door segment 114 includes a molded logo 114a. Tear line 115 is a reduced thickness H-pattern section formed on the inside of body 112. Tear line 115 is conventionally ruptured by the force of deploying air bag 91 to form door segments 113 and 114, which hinge open about their upper or lower edges to form an open deployment path for air bag 91.

The sides of central body 112 extend downwardly to form L-shaped side mounting flanges 116 and 117 which include respective mounting apertures 116a, 116b, 116c, 117a, 117b and 117c. The ends 118, 119 of body 112 include respective projecting mounting tabs 118a, 119a which include spaced mounting holes 118b and 119b. Mounting tabs 118a, 119a are shaped to mate with mounting tabs 72a, 73a of container 70 (FIG. 5a), with mounting holes 118b aligning with holes 72b and holes 119b aligning with holes 73b.

Assembly of air bag module 28 is quite simple and is greatly facilitated by the arrangement of the mounting apertures and the design of the component parts, as will now be explained with particular reference to FIGS. 3, 7a, 7b, 7c and 7d. All mounting apertures are formed in the mounting flanges so as to be aligned for assembly. Thusly, all "a" apertures in the component parts align, as do all "b" and "c" apertures. In addition, the end apertures in the flanges are spaced differently from the ends of the component parts (air bag hem, retainer ring, housing and container) to prevent inadvertent 180° misassembly of the component parts, thereby "goof-proofing" the air bag module. Thusly, the aligned "a" end apertures are spaced further from the ends of their component parts than are the "b" end apertures. Air bag hem mounting holes 95 are similarly configured.

This assures, for example, that apertures 56a, 76a, 102a and 116a must align to enable assembly, as must apertures 54c, 77c, 103c and 117c. If any component is inadvertently rotated 180°, the apertures will misalign and assembly of all component parts onto threaded mounting studs 110 cannot occur. This arrangement also assures that mounting tab holes 73b align with tab holes 119b and that tab holes 72b align with tab holes 118b to enable subsequent mounting of assembled module 28 into a vehicle.

Air bag subassembly 90 is assembled by first inverting retainer ring 92, inserting studs 110 within mounting holes 102a, 102b, 102c, 103a, 103b and 103c, and staking the heads of studs 110 to mounting flanges 76, 77. Hem 94 of air bag 91 is next wrapped about retainer ring 92, with studs 110 projecting through mounting holes 95. Hem 94 is then sewn back upon itself, securing air bag 91 to retainer ring 92. Air bag 91 is then folded in a manner to blow back through ring opening 96 for deployment. After air bag subassembly 90 is assembled, cover 30 is attached to it by mounting one of flanges 116 or 117 over studs 110 and stretching the other flange to insert the other three studs 110 into the mounting apertures.

Inflator 60 is then inserted into housing 70, with proper orientation assured by the D-shaped orientation lug 68 and aperture 84 and with antirotation pins 69 inserted into mating holes 85. Next, container 40 is assembled to housing 70. Since mounting flange 51 must fit within and abut the end of container end wall 83, any attempted misassembly by inserting collar 52 in flanged end fitting will misalign the mounting apertures, due to the different spacing of end apertures. The assembled housing 70, inflator 60 and container 40 are then assembled to the air bag and cover by orienting to align the mounting apertures with studs 110.

Upon assembly, cover 30 and air bag subassembly 90 fit within perimeter frame 71. Since the mounting apertures and studs are differently spaced misassembly cannot occur. These assembled component parts are then secured together by tightening nuts 111 onto studs 110 to secure all components, except inflator 60, together. Inflator 60 is secured in the assembly since it is tightly clamped between the strap and rib pairs 87, 48 and 89, 50.

As assembled, air bag subassembly 90 is confined in its folded state within housing 70. The housing side walls, comprising upper portions 74, 73 and lower portions 79, 80, together with the end walls, comprising upper portions 72, 73 and lower portions 81, 83, form a rectangular storage chamber for air bag subassembly 90. These walls define an upper deployment opening 104 for air bag 91, and a lower gas discharge opening 105 for inflator 60. Discharge opening 104 is normally closed by cover 30.

Mounting of the assembled air bag module 28 to the vehicle can be accomplished in several different ways, depending on the particular application. The assembled module 28 can be mounted to support 36 by securing studs through mounting tab holes 72b, 73b and/or by bending out and securing selected tabs 58a, 58b, 59a, 59b to other support structure. The variable spacing of holes 72a and 73a assures the proper orientation of module within instrument panel deployment opening 32 (FIG. 1). Orientation is important to assure proper deployment of air bag 91, which is usually specifically folded for directional deployment. It is also cosmetically important, so that cover logo 114a or any other surface treatment is properly oriented.

Upon actuation of inflator 60 by vehicle sensors, inflation gas will emanate from discharge holes 66 through housing opening 105 and air bag opening 96 to begin inflating air bag 91. Air bag 91 will exert an increasing force on cover 30 which will rupture along tear line 115, creating and opening door segments 113 and 114. Air bag 91 will then deploy through opening 104 in a well-known manner.

Figure 9:
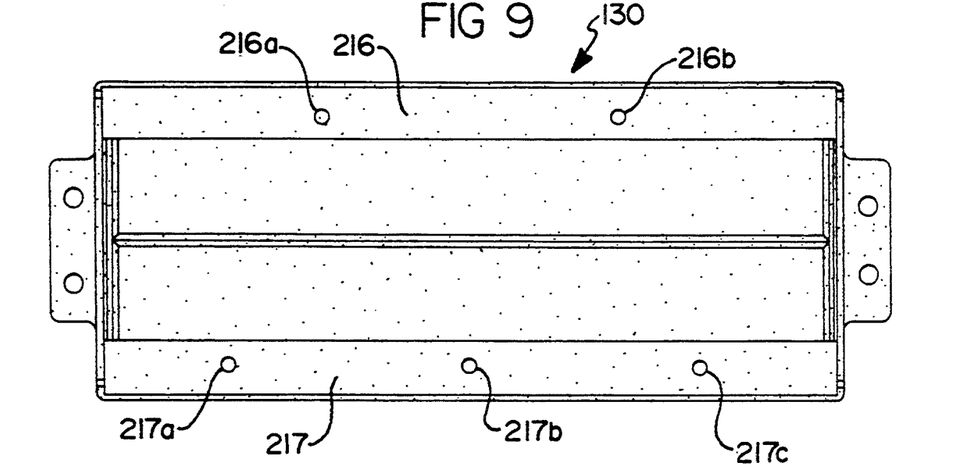
FIG. 9 is a bottom view of another embodiment of a cover.
Figure 10:
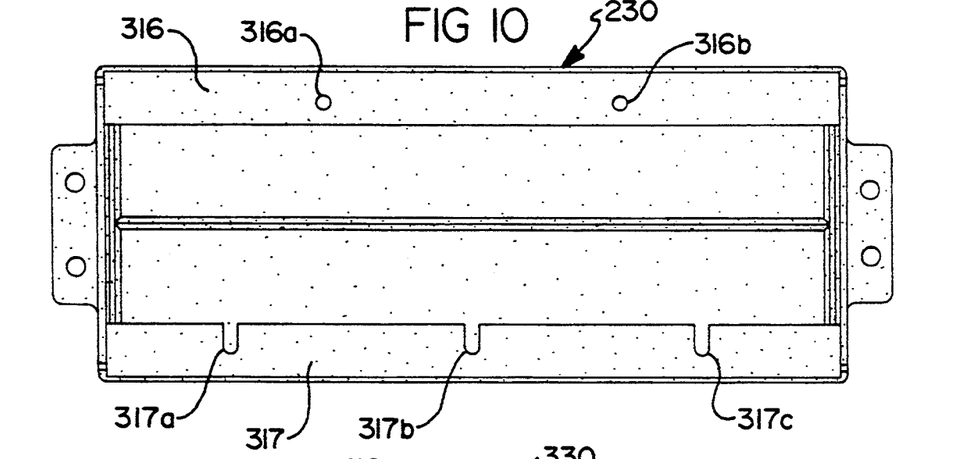
FIG. 10 is a bottom view of yet another embodiment of a cover.
Figure 11:
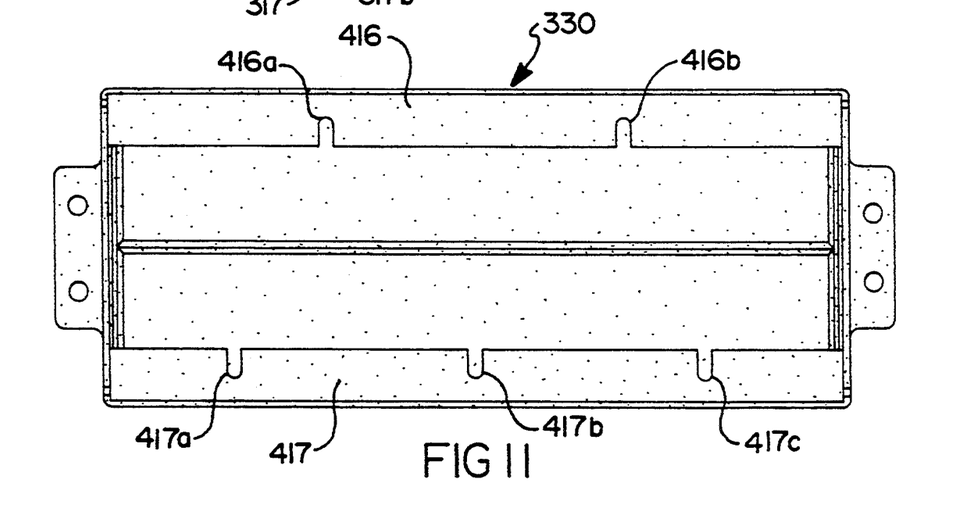
FIG. 11 is a bottom view of still another embodiment of a cover.

Alternative embodiments of cover 30 are illustrated in FIGS. 9, 10 and 11. These covers are configured to facilitate the assembly air bag module 28, while assuring retention of the cover and its doors upon inflator actuation and subsequent air bag rupturing of the cover and deployment through the opened door segments. These alternate covers, denoted 130, 230 and 330 are identical to cover 30 except for the location, configuration and number of mounting apertures in flanges 116, 117.

In FIG. 9, cover 130 has only two spaced mounting apertures 216a, 216b in flange 216, while retaining three apertures 217a, 217b, 217c in flange 217. An air bag module using this cover 130 would have the air bag hem, and the retainer ring, housing, and container mounting flanges similarly modified. This ⅔ mounting aperture arrangement eliminates the need to differentially space the flange mounting apertures provide "goof-proofing" (preventing inadvertent 180° misassembly).

In FIG. 10, cover 230 retains the two mounting apertures 316a, 316b in flange 316, but provides slots 317a, 317b, 317c as the mounting apertures in flange 317. This configuration retains the ⅔ goof-proofing and eliminates the need to stretch the cover flanges over the mounting studs, since the open-ended slots can be slid onto the studs. The peripheral confinement of flanges 316 and 317, plus the clamping force of nuts 111 assure cover retention during air bag deployment.

Finally, in FIG. 11, cover 330 retains the ⅔ arrangement, but provides all mounting apertures 416a, 416b, 417a, 417b and 417c in the form of open-ended slots. This arrangement further speeds assembly of cover 330 to the air bag subassembly 90, since there is no longer any need to mount the mounting studs through small holes.

Although not shown, the hem of air bag 91 and the mounting flanges of retainer ring 92, housing 70 and container 40 would be revised to a similar 3/2 configuration of their mounting apertures. However, only the cover 30 would be revised to contain slotted mounting apertures.

Thus, this invention provides an air bag module that has a reduced number of parts that are extremely simple and quick to assemble, that cannot be misassembled, that can accommodate all available makes and types of inflators, and which requires only five or six studs for the entire assembly.

While only a preferred and alternate embodiments have been illustrated and described, obvious modifications thereof are contemplated within the scope of this invention and the following claims.

The embodiments of the invention in which an exclusive property or privilege is claimed in defined as follows:

1. An air bag module comprising an air bag having an opening,
   an air bag retainer ring secured to the air bag about the opening and having a mounting flange,
   a housing having spaced side and end walls defining a rectangular air bag storage chamber for storing the folded air bag and having an upper air bag deployment opening and a bottom gas discharge opening, a mounting flange extending from each of the side walls, and at least two axially-spaced part-circumferential straps spanning the gas discharge opening to interconnect the side walls and form an inflator cradle,
   an elongated inflator located on the straps and comprising a substantially cylindrical case having a plurality of gas discharge holes, a cap end and a blank end,
   an inflator container comprising a U-shaped body forming bottom and side walls, at least two axially-spaced raised part-circumferential ribs formed in the bottom wall, each diametrically opposed from one of the straps to form pairs of straps and ribs, the pairs being spaced from the housing end walls to enable clamping of either an inflator having a case with an outward tapered section near its cap or an inflator having a purely cylindrical casing, and a mounting flange extending from each of the side walls,
   a plurality of aligned mounting apertures formed in all of the mounting flanges, and
   a plurality of threaded fasteners extending through the aligned apertures to clamp the air bag retainer ring, the housing and the inflator container together, thereby clamping the inflator between the strap and rib pairs, whereby the ribs space the inflator from the side and bottom walls of the inflator container which functions as a heat shield.

2. The air bag module of claim 1, wherein the mounting apertures are spaced along the flanges in a pattern which aligns the apertures of all flanges to permit assembly when the retainer ring, the housing and the container are in a predetermined relative orientation, but which misaligns to prevent misassembly when any of the retainer ring, the housing and the container are not in the predetermined relative orientation.

3. The air bag module of claim 2, wherein six fasteners are provided, each mounting flange includes three mounting apertures forming opposed center and end pairs of mounting apertures, and one end pair has a different spacing from the adjacent flange end than that of the other end pair to cause misalignment of the apertures upon attempted misassembly.

4. The air bag module of claim 2, wherein five fasteners are provided, one mounting flange on each of the retainer ring, housing and container includes three mounting apertures and the other mounting flange includes two mounting apertures spaced to cause misalignment of the apertures upon attempted misassembly.

5. The air bag module of claim 1, wherein the threaded fasteners comprise threaded studs secured to the air bag retainer ring, and threaded nuts which engage the studs beneath the container flanges.

6. The air bag module of claim 1, wherein the housing end walls include locating flanges extending therefrom, each of which has a spaced pair of locating apertures of different spacing to assure a predetermined orientation of the air bag module upon eventual assembly in a vehicle.

7. The air bag module of claim 1, wherein one of the housing end walls is formed cooperate with one end of the container to embrace the inflator end cap, the other housing end wall is shaped to embrace the other end of the inflator container, thereby forming a substantially closed inflator chamber beneath the housing discharge opening, enabling use of a thrust-neutral inflator.

8. The air bag module of claim 1, wherein the pairs of ribs and straps are located to cover only the highest pressure gas discharge holes when used with a directional inflator having gas discharge holes that open at different pressures.

9. The air bag module of claim 1, wherein two clamping strap and rib pairs are provided and the housing includes a spaced pair of bridging straps which interconnect its side walls but are radially spaced from the inflator case and do not block any inflator discharge holes.

10. An air bag module comprising an air bag having an opening, an air bag retainer ring secured to the air bag about the opening and having a mounting flange, a housing having spaced side and end walls defining a rectangular air bag storage chamber for storing the folded air bag and having an upper air bag deployment opening and a bottom gas discharge opening, a mounting flange extending from each of the side walls, and at least two spaced straps spanning the gas discharge opening to interconnect the side walls and form an inflator cradle, an elongated inflator located on the straps and comprising a substantially cylindrical case having a plurality of gas discharge holes, a cap end and a blank end, an inflator container comprising a U-shaped body forming bottom and side walls, at least two spaced raised ribs formed in the bottom wall, and a mounting flange extending from each of the side walls, a plurality of aligned mounting apertures formed in all of the mounting flanges, a plurality of threaded studs secured to the air bag retainer ring and extending through the aligned apertures, a plurality of threaded nuts which engage the studs beneath the container flanges to clamp the air bag retainer ring, the housing and the inflator container together, thereby clamping the inflator between the straps and ribs, whereby the ribs space the inflator from the side and bottom walls of the inflator container which functions as a heat shield, and a cover assembly comprising a main body having weakened sections which define doors and which rupture upon inflation of the air bag to open a deployment opening for the air bag, and a pair of mounting flanges extending from the sides of the main body, each having a plurality of mounting apertures aligned with the apertures in the other mounting flanges.

11. The air bag module of claim 10, wherein the cover side flanges are L-shaped to embrace the retainer ring when the side flanges are assembled over the threaded studs which extend sequentially through the aligned mounting flange apertures of the retainer ring, the cover, the housing and the container.

12. The air bag module of claims 11, wherein the apertures on one cover mounting flange are open-ended slots to facilitate assembly of the cover to the retainer ring.

13. The air bag module of claims 12, wherein the housing flanges, side walls and end walls to form an enclosure confining the retainer ring and cover mounting flanges upon assembly.

* * * * *